(12) United States Patent
Pursley

(10) Patent No.: US 6,364,421 B1
(45) Date of Patent: Apr. 2, 2002

(54) WHEEL BALANCING WEIGHTS

(75) Inventor: Michael T. Pursley, Goodlettsville, TN (US)

(73) Assignee: Perfect Equipment Company LLC, LeVergne, TN (US)

( * ) Notice: Subject to any disclaimer, the term of this patent is extended or adjusted under 35 U.S.C. 154(b) by 0 days.

(21) Appl. No.: 09/208,141

(22) Filed: Dec. 9, 1998

(51) Int. Cl.$^7$ ............................................... F16F 15/28
(52) U.S. Cl. ....................................... 301/5.21; 428/40.1
(58) Field of Search ............................. 301/5.21, 5.22; 24/304, 306; 428/40.1, 41.8

(56) References Cited

U.S. PATENT DOCUMENTS

| | | | | |
|---|---|---|---|---|
| 2,640,727 A | * | 6/1953 | Kennedy | 301/5.21 |
| 2,765,998 A | * | 9/1956 | Engert | 428/40.1 |
| 3,154,347 A | * | 10/1964 | Griffith | 301/5.21 |
| 3,273,941 A | * | 9/1966 | Skidmore | 301/5.21 |
| 3,960,409 A | | 6/1976 | Songer | 301/5.21 |
| 4,300,803 A | * | 11/1981 | Chorosevic | 301/5.21 |
| 4,619,253 A | * | 10/1986 | Anhauser et al. | 428/40.1 X |
| 5,770,288 A | * | 6/1998 | Carney, Jr. | 428/40.1 |
| 5,876,817 A | * | 3/1999 | Mathna e tal. | 428/41.8 X |

* cited by examiner

Primary Examiner—Russell D. Stormer
(74) Attorney, Agent, or Firm—Woodcock Washburn LLC

(57) ABSTRACT

A wheel balancing device is provided having a plurality of wheel balancing weights attached to a top surface of an elongate tape and a backing strip removably attached to and protecting an adhesive layer on the bottom surface of the tape with the backing strip having a width greater than that of the tape to facilitate removing the backing strip from the tape prior to installation of the wheel weights onto a rim of a wheel. The greater width of the backing strip as compared to the tape facilitates removal of the backing strip from the tape by a user who may simply grab a portion of the backing strip which extends beyond the tape to peel away the backing strip. Preferably, the plurality of wheel balancing weights are connected in end-to-end relationship on the tape and are preformed of a generally uniform size and weight. Any number of the plurality of wheel balancing weights may be separated from the remainder of the weights by merely severing the tape and backing strip and breaking any living hinge or other means of interconnection, if any, between the last chosen weight and the remainder of the weights to provide a discreet unit of wheel balancing weights having the desired total or combined weight. After separating the desired number of wheel balancing weights from the remainder of the weights on the tape, the backing strip is removed from the tape and the adhesive bottom surface of the tape is secured to the rim of the wheel at the desired location to rotationally balance the wheel.

12 Claims, 1 Drawing Sheet

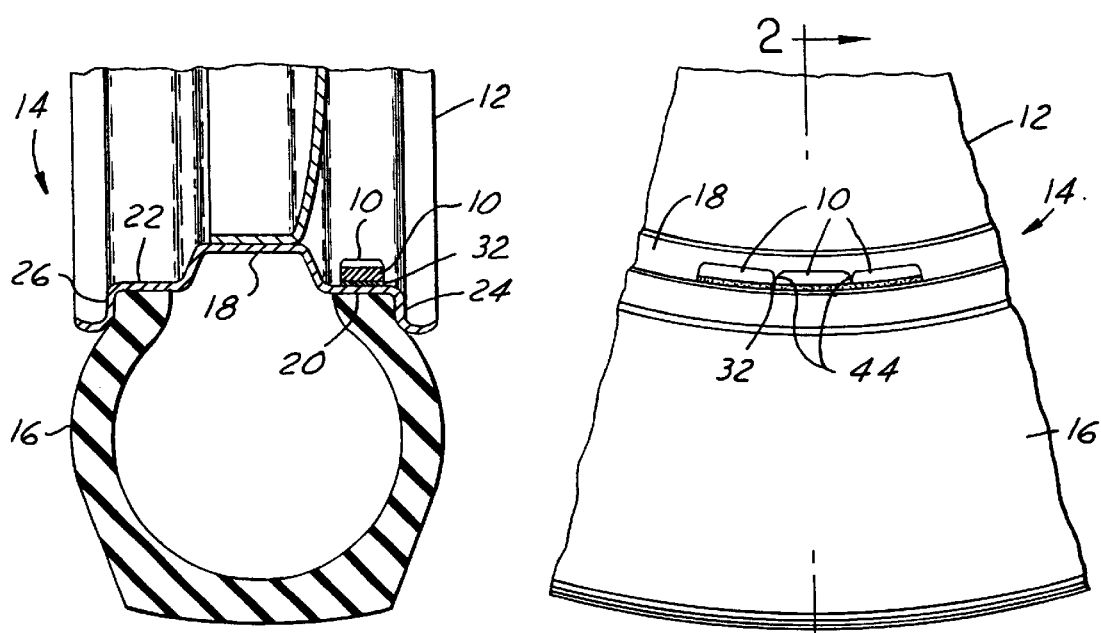
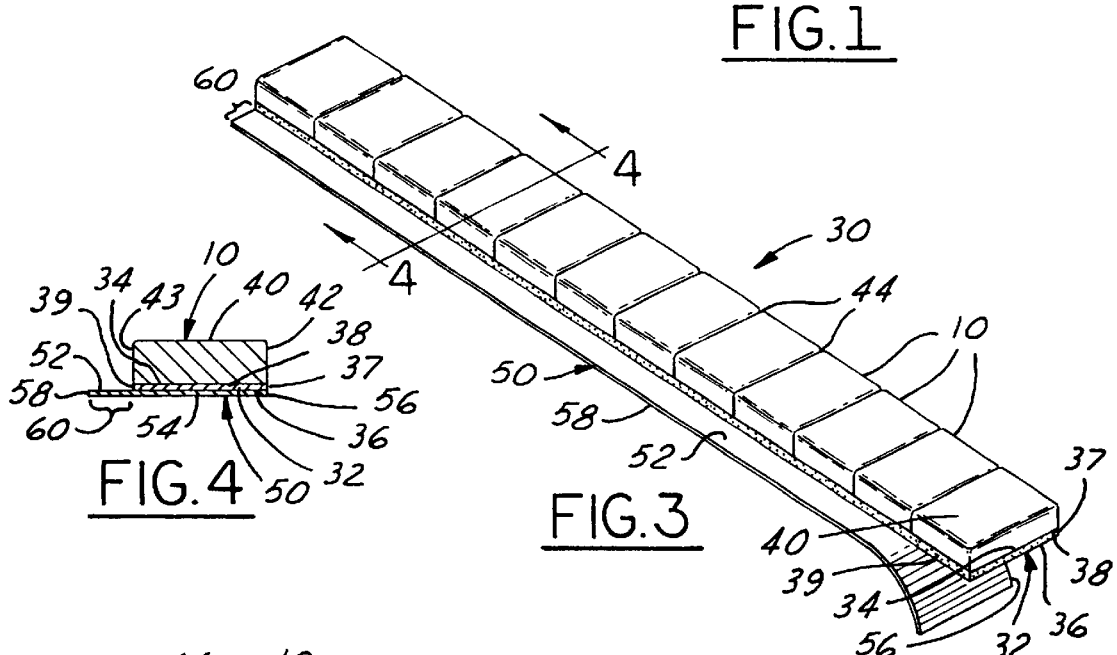
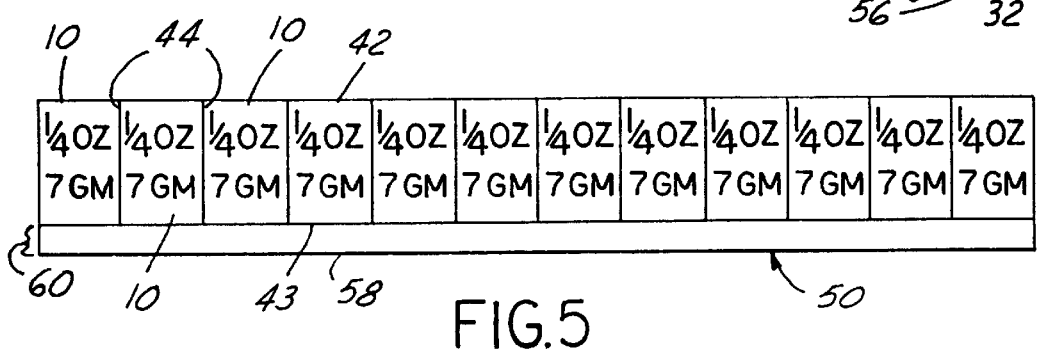

WHEEL BALANCING WEIGHTS

FIELD OF THE INVENTION

This invention relates generally to a wheel balancing device, and more particularly to an improved construction and arrangement for adhesive wheel balancing weights.

BACKGROUND OF THE INVENTION

It is extremely difficult to produce a pneumatic tire and an associated rim which are perfectly in balance when combined and rotated. Therefore, it has been known to apply a counterbalancing weight to the wheel or rim to compensate for the rotational imbalance of the pneumatic tire and rim assembly. Conventionally, these counterbalancing weights have included lead weights molded around a steel clip which in turn is attached to a flange of the rim or wheel. Another method of attaching one or more lead weights to a rim of a wheel is disclosed in U.S. Pat. No. 3,960,409, which discloses a plurality of preformed weights secured upon an elongate tape having an adhesive backing to attach the weights to the rim of the wheel. A backing strip is removably attached to the adhesive backing of the tape to protect the tape. This backing strip must be removed prior to installation of the lead weights onto a rim of a wheel. However, it is difficult to remove the backing strip from the tape because the surface area of the backing strip is coextensive with the surface area of the tape, thereby making it extremely difficult to initially separate the backing strip from the tape.

SUMMARY OF THE INVENTION

A wheel balancing device is provided having a plurality of wheel balancing weights attached to a top surface of an elongate tape, and a backing strip removably attached to and protecting an adhesive layer on the bottom surface of the tape, with the backing strip having a width greater than that of the tape to facilitate removing the backing strip from the tape prior to installation of the wheel weights onto a rim of a wheel. The greater width of the backing strip as compared to the tape facilitates removal of the backing strip from the tape by a user who may simply grab a portion of the backing strip which extends beyond the tape to peel away the backing strip. Preferably, the plurality of wheel balancing weights are connected in end-to-end relationship on the tape and are preformed of a generally uniform size and weight. Any number of the plurality of wheel balancing weights may be separated from the remainder of the weights by merely severing the tape and backing strip and breaking any living hinge or other means of interconnection, if any, between the last chosen weight and the remainder of the weights to provide a discreet unit of wheel balancing weights having the desired total or combined weight. After separating the desired number of wheel balancing weights from the remainder of the weights on the tape, the backing strip is removed from the tape and the adhesive bottom surface of the tape is secured to the rim of the wheel at the desired location to rotationally balance the wheel.

Objects, features and advantages of this invention include providing a wheel balancing device which provides a plurality of preformed wheel balancing weights which are easily separable into discreet units of varying total weight as desired, facilitates installation of the wheel balancing weights onto a wheel by providing a backing strip which is easy to separate from the tape, and is durable, of relatively simple design and economical manufacture and assembly.

BRIEF DESCRIPTION OF THE DRAWINGS

These and other objects, features and advantages of this invention will be apparent from the following detailed description of the preferred embodiments and best mode, the appended claims and the accompanying drawings in which:

FIG. 1 is a fragmentary side elevation of the bottom portion of a pneumatic tire and wheel rim upon which a discreet unit of wheel balancing weights, taken from a wheel balancing device embodying the present invention, is mounted;

FIG. 2 is a cross-sectional view taken generally along the line 2—2 of FIG. 1;

FIG. 3 is a perspective view of a wheel balancing device according to the present invention with a portion of the backing strip partially removed;

FIG. 4 is a cross-sectional view taken generally along line 4—4 of FIG. 3; and

FIG. 5 is a plan view of the wheel balancing device.

DETAILED DESCRIPTION OF THE PREFERRED EMBODIMENTS

Referring in more detail to the drawings, FIG. 1 illustrates a plurality of wheel balancing weights 10 mounted on a rim 12 of a vehicle wheel 14, which also includes a pneumatic tire 16 mounted on the rim 12. As shown in FIGS. 1 and 2, the rim 12 includes a central well portion 18, an outboard bead receiving flange 20, an inboard bead receiving flange 22, and bead retainer flanges 24 and 26. The bead receiving flanges 20,22 are cylindrical and coaxial with the rotary axis of the wheel 14.

As best shown in FIGS. 3–5, a wheel balancing device 30 has a plurality of wheel balancing weights 10 mounted in end-to-end relationship upon an elongate strip of tape 32 having a top surface 34, a bottom surface 36 and a pair of side edges 37,39 defining the width of the tape 32. A bottom surface 38 of each wheel balancing weight 10 is firmly attached to the top surface 34 of the tape 32 by suitable adhesive means, such as an adhesive coating on the top surface 34 of the tape 32. The bottom surface 36 of the tape is also preferably coated with a suitable adhesive which will bond the tape 32 to the rim 12 of the wheel 14 and remain bonded to a portion of the rim 12 suitable to rotationally balance the rim 12. In the preferred embodiment, the tape 32 is a double-sided, pressure-sensitive adhesive tape.

Any number of weights 10 may be provided on a strip of tape 32 and preferably, each weight 10 is of the same size and weight. Nominally, in the specific embodiment shown in FIG. 5, each weight may be about ¼ of an ounce or 7 grams in weight. Other magnitudes or sizes of weights may also be provided, preferably in separate strips. Each weight has a top surface 40, bottom surface 38 and a pair of side walls 42, 43 defining the width of the weight 10.

The weights 10 are preferably integrally formed in an elongate strip from lead which is preformed into its final desired shape. Transverse grooves 44 evenly spaced along the strip define the individual weights 10 which may be independently separated from the strip. Preferably, the grooves 44 do not extend completely through the strip and the remaining material provides a living hinge between adjacent weights 10 which is flexible and adapted to be severed, either by manually bending or breaking a hinge or by mechanically severing a hinge, such as with a knife or a pair of metal snips. Alternatively, the grooves 44 may extend completely through the weights 10 providing a plurality of independent, unconnected wheel balancing weights 10 secured adjacent one another on the elongate tape 32. As another alternative, the wheel balancing weights 10 may be individually formed from lead and separately attached to the tape 32. Whatever the means of forming the plurality of wheel balancing weights 10, they may be separated from the remainder of the weights on the strip, either individually or in groups, to provide discreet units of wheel balancing weights 10.

To protect the bottom surface 36 of the tape 32 prior to use of the wheel balancing weights 10, a generally non-adhesive polymeric backing strip 50 is removably attached to the bottom surface 36 of the tape 32. The backing strip 50 extends the full length of the tape 32, and has a top surface 52 adjacent the tape 32, a bottom surface 54 and a pair of side edges 56,58 which define a surface area greater than that of the bottom surface 36 of the tape 32 to facilitate manually removing the backing strip 50 from the tape 32 prior to installation of the wheel balancing weights 10 on a rim 12 of a wheel 14. As best shown in FIG. 4, the wheel balancing weights 10 preferably have a generally uniform width defined between their side walls 42,43 and the tape has a width defined between its side edges 37,39 which is substantially the same as the width of the weights 10. The backing strip 50 preferably has a width defined between its side edges 56,58 which is greater than the width of the tape 32. The greater width of the backing strip 50 provides an elongate tab portion 60 extending the length of the wheel balancing device 30, which may be grasped by the user independently of the tape 32 to facilitate removing the backing strip 50 from the tape 32. Desirably, a first side edge 56 of the backing strip 50 aligns with a first side edge 37 of the tape 32, such that the second side edge 58 of the backing strip 50 is offset from the second side edge 39 of the tape 32 to define the tab portion 60 of the backing strip 50. Preferably, the backing strip has a width greater than the width of the tape 32 by at least 1/16 of an inch.

To balance a wheel 14 of a vehicle, one or more wheel balancing weights 10 are removed from the remainder of the weights 10 on the device 30 by severing the backing strip 50, tape 32 and any living hinge or other interconnection between a pair of weights to provide a discreet unit of wheel balancing weights 10 having a desired total weight suitable to balance the wheel 14. To install the discreet unit of wheel balancing weights 10, the backing strip 50 is removed from the tape 32, preferably by grasping the tab portion 60 of the backing strip 50 and peeling the backing strip 50 from the tape 32 to expose the adhesive bottom surface 36 of the tape 32. The bottom surface 36 of the tape 32 is then pressed onto the desired portion of the rim 12 of the wheel 14 as desired to rotationally balance the wheel 14. As is apparent from the above description, the wheel balancing device 30 is extremely versatile and greatly facilitates the use and speed of application of any number of wheel balancing weights 10 to the rim 12 of a wheel 14.

What is claimed is:

1. A wheel balancing device comprising:
    an elongate tape having a top surface, a bottom surface and a pair of side edges defining the width of the tape;
    at least one weight each having a bottom surface;
    means securing the bottom surface of said weight to the top surface of said tape;
    adhesive means on the bottom surface of said tape for attaching said tape to a rim of a wheel; and
    an elongate backing strip having a bottom surface, a pair of side edges defining the width of the backing strip and a top surface removably attached to said bottom surface of said tape, said backing strip having a width greater than the width of said tape to facilitate removing said backing strip from said tape.

2. The device of claim 1 wherein the width of said backing strip is greater than the width of said tape by at least 1/16 of an inch.

3. The device of claim 1 wherein a first side edge of said backing strip is generally aligned with a first side edge of said tape.

4. The device of claim 3 wherein a second side edge of said backing strip is offset from a second side edge of said tape by at least 1/16 of an inch.

5. The device of claim 3 wherein each weight has a pair of side surfaces defining the width of a weight and the width of a weight is substantially the same as the width of said tape.

6. The device of claim 1 wherein the backing strip is formed of a substantially non-adhesive polymeric film.

7. A wheel balancing device comprising:
    an elongate tape having a pair of side edges defining the width of the tape, a top surface and a bottom surface and an adhesive disposed on both the top surface and bottom surface;
    a plurality of weights attached to the top surface of the tape by the adhesive on the top surface; and
    backing strip having a pair of side edges defining the width of the backing strip, a bottom surface and a top surface removably attached to the bottom surface of the tape, the backing strip has a width greater than the width of the tape along the entire length of the device to facilitate removing the backing strip from the tape and is severable to permit one or more weights to be separated from the remaining weights.

8. The device of claim 7 wherein the width of said backing strip is greater than the width of said tape by at least 1/16 of an inch.

9. The device of claim 7 wherein a first side edge of said backing strip is generally aligned with a first side edge of said tape.

10. The device of claim 9 wherein a second side edge of said backing strip is offset from a second side edge of said tape by at least 1/16 of an inch.

11. The device of claim 9 wherein each weight has a pair of side surfaces defining the width of a weight and the width of a weight is substantially the same as the width of said tape.

12. The device of claim 7 wherein the backing strip is formed of a substantially non-adhesive polymeric film.

* * * * *